United States Patent [19]

Kramer

[11] Patent Number: 5,056,188
[45] Date of Patent: Oct. 15, 1991

[54] PROCESS AND APPARATUS FOR SECURING A GRIP ELEMENT TO CROCKERY OR POTTERY

[75] Inventor: Walter Kramer, Mainz, Fed. Rep. of Germany

[73] Assignee: Schott Glaswerke, Mainz, Fed. Rep. of Germany

[21] Appl. No.: 388,465

[22] Filed: Aug. 2, 1989

[30] Foreign Application Priority Data

Aug. 3, 1988 [DE] Fed. Rep. of Germany ....... 3826314

[51] Int. Cl.⁵ ............................................. A47J 45/00
[52] U.S. Cl. ................................. 16/110 R; 16/114 A; 403/265
[58] Field of Search ................. 16/110 R, 121, 114 A, 16/124, 125, 116 R, DIG. 12, DIG. 19, DIG. 24, DIG. 40; 403/265, 266, 267, 268, 17

[56] References Cited

U.S. PATENT DOCUMENTS

| | | | |
|---|---|---|---|
| 4,019,221 | 4/1977 | Baumgarten | 16/114 A |
| 4,596,337 | 6/1986 | Gerold | 403/265 |
| 4,683,155 | 7/1987 | Majthan | 16/DIG. 19 |
| 4,812,193 | 3/1989 | Gauron | 156/293 |
| 4,837,892 | 6/1989 | Lo | 16/DIG. 12 |

FOREIGN PATENT DOCUMENTS

| | | | |
|---|---|---|---|
| 421616 | 4/1967 | Switzerland | 16/110 |
| 894220 | 12/1981 | U.S.S.R. | 403/268 |
| 2133496 | 7/1984 | United Kingdom | 403/268 |

Primary Examiner—Richard K. Seidel
Assistant Examiner—Chuck Y. Mah
Attorney, Agent, or Firm—Millen, White & Zelano

[57] ABSTRACT

A process and apparatus are provided for securing a grip element or handle, preferably of plastic, to a crockery or pottery article. An adhesive is injected under pressure into a passage in the grip element and flows to the surface to be joined to the article. The cured adhesive material holds the grip element to the article both adhesively and by means of a mechanical locking action.

11 Claims, 3 Drawing Sheets

PROCESS AND APPARATUS FOR SECURING A GRIP ELEMENT TO CROCKERY OR POTTERY

BACKGROUND OF THE INVENTION

The invention relates in general to a method and apparatus for securing a grip element to a crockery or pottery article and, more particularly, to a method and apparatus in which an adhesive is used to join a grip element to such articles.

Grip elements such as grips, knobs, handles, etc., are often formed of plastic. These grip elements are mechanically secured to a crockery or pottery article by metal parts such as clamping bands, disks or washers and screws. When the crockery or pottery article, usually pots, pans, lids, jugs, jars, etc., made from glass, glass ceramic, ceramic, porcelain, glazed earthenware or the like, is intended to be used in a microwave oven, no metal parts can be used to attach the grip element to the article. In such cases, an adhesive can be used. The adhesive used for this purpose must meet the stringent demands of cooking operations. The adhesive must form a firm bond both with the grip element and the crockery or pottery article. It must be elastic enough to compensate for the great differences in the coefficients of expansion. For example, glass has a coefficient of expansion of $3.3 \times 10^{-6}/K$, whereas the coefficient of expansion of plastic is about $80 \times 10^{-6}/K$. In addition, the adhesive must be temperature-resistant up to about 280° C., it must have an adequate shear resistance and be resistant to acids, alkalis and foodstuffs. Adhesives satisfying these criteria are often highly viscous and difficult to use.

The use of adhesives to secure a plastic grip to a jug of glass or ceramic is known from DE-PS 3,048,783 and 3,109,759. The plastic/glass adhesive bond is generally unsuitable for cooking because the adhesive is temperature-resistant only up to about 100° C. These patents disclose the amount of adhesive which can be used to secure the plastic grip to the jug. The adhesive flows through holes in the grip and can form thickened portions on a side of the grip remote from the side joined to the jug. These thickened or enlarged portions of adhesive form a lock and mechanically hold the grip to the glass jug. Adhesives for such joints cannot, however, be of lower viscosity because otherwise the thickened adhesive portion and resultant mechanical lock will not be formed.

It is therefore desirable to provide a method and apparatus for adhesively securing a grip element to a piece of crockery or pottery which fulfills the aforementioned conditions and avoids the disadvantages of the prior art.

SUMMARY OF THE INVENTION

According to the present invention, the problems of the prior art are overcome by positioning a grip element onto the intended adhesion areas on a crockery or pottery article, and injecting under pressure an adhesive into a passage in the grip element which communicates with the adhesive area, until the adhesive flows through at least one passage to the adhesion area and is evenly distributed between the grip element and the surface of the article. By using the method and apparatus of the present invention, even highly viscous adhesives can be used since they will flow over and cover the entire adhesion area. The process of the present invention differs from the prior art processes which do not effectively utilize a thixotropic behavior of certain adhesive compositions. By employing the process of the present invention to inject an adhesive under pressure into the areas to be joined, the thixotropic behavior of the adhesive can be effectively utilized, i.e., the viscosity of the adhesive drops when agitated during the high-pressure injection, thus ensuring that the adhesive has been distributed over the surfaces to be joined.

Preferred adhesive compositions which are suitable for use in the process and apparatus of the present invention and which are microwave oven safe comprise from about 8-15 wt.% of highly dispersed silica (Aerosil ®), 2-8 wt.% of crosslinking agents (e.g., alkyltriacetoxisilane, 20-40 wt.% of plasticizer, 40-70 wt.% of dimethyl polysiloxane. Such adhesives are commercially available in great variety by numerous producers.

Under normal atmospheric pressure, these preferred adhesive compositions have a viscosity in the range of from about 20,000 to 300,000 dPas at 21° C. However, when agitated by being subjected to injection pressures of preferably from about 8 to 100 bar, more preferably from about 10 to 60 bar, these adhesive compositions exhibit thixotropic characteristics and their viscosity drops up to 50%. For this reason, in a preferred aspect of the present invention, the adhesive composition is injected into the passage of the grip element at a pressure (measured at the head of the injection means) of from about 10 to 30 bar.

Preferred plastics from which the handle may be formed which are microwave oven safe are ABS (acrylbutadiene-styrene), PC (polycarbonate), PPS (polyphenylenesulfide) or PPO (polyphenyleneoxide).

In a preferred embodiment, the grip element is shaped so that a portion of the cured solid adhesive forms a mechanical lock with the grip element. One preferred mechanical lock is formed by a grip element with an angled passage into which the adhesive is injected. When cured, the solidified adhesive forms a locking connection with the grip element. Another preferred mechanical lock uses undercut grooves in the surface of the grip element to be joined to the article. Preferably, such grooves are smaller at the surface of the grip element than interiorly, i.e., they have an outboard diameter smaller than the inboard diameter. Such grooves, in addition, provide an enlarged adhesive contact area on the grip element and thus provide a strengthened adhesive bond. By using this technique, a durable and firm bonding of an adhesive to the grip element can be achieved, even when an adhesive is used which does not adhere particularly well to the plastic grip element.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein.

DETAILED DESCRIPTION OF THE DRAWINGS

Figure 1:
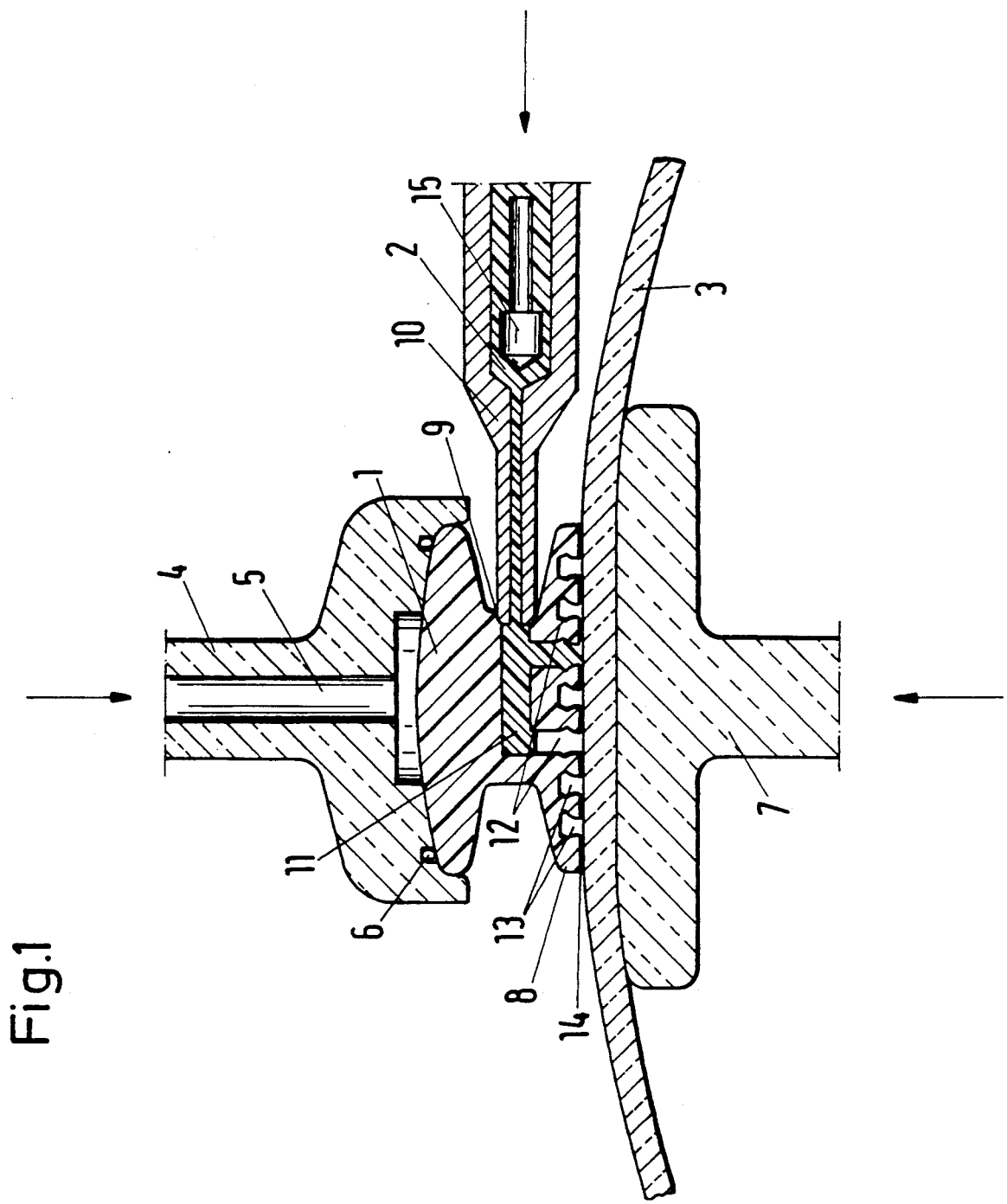
FIG. 1 is a vertical cross-sectional view of the apparatus of the present invention, illustrating the injection of an adhesive into a passage in the grip element to be joined to a crockery or pottery article.

FIG. 1 illustrates a preferred apparatus used to carry out the process according to the present invention. In FIG. 1, knob or grip element 1 is shown being secured by means of an adhesive 2 to a glass lid 3. Knob 1 is held by a chuck or holding means 4 which has a vacuum chamber, one wall of which is formed by the top of knob 1. The knob 1 is held in contact with chuck means 4 by subjecting the interior 5 of chuck 4 to a partial vacuum. An 0-ring 6 partially seated in the head of chuck means 4 provides a seal over a rough surface on the knob. The glass lid 3 is shown positioned on article holder or support means 7 which is shaped so that the glass lid 3 can be positioned to receive the knob 1. The chuck means 4 which is aligned with support means 7 moves the article and knob 1 toward one another in the direction of the arrows so that the peripheral skirt 8 of knob 1 is firmly pressed into contact with the surface of glass lid 3.

In a preferred embodiment, the peripheral skirt or projection 8 extends from the surface of knob 1 a distance sufficient to form a space through which the adhesive can flow over the entire adhesive area to be joined. Preferably, the skirt 8 extends from the surface of grip element 1 a distance of from about 0.5 to 1.8 mm, more preferably from about 0.8 to 1.2 mm.

A metering or proportioning adhesive nozzle 10 is adapted to move laterally in the direction of the arrow and into engagement with an outwardly conically shaped opening 9 on knob 1. Adhesive 2 is then injected through said metering adhesive nozzle 10 into a transverse passage 11 in knob 1. The adhesive 2 flows via passage 12 to the surface of glass lid 3 and then fill the space between the glass lid 3 and knob 1 and continues to flow radially outwardly until it reaches the peripheral skirt 8. The undercut annular grooves 13 are also filled with adhesive 2. The air displaced by the adhesive 2 escapes through vent passages 14 in skirt 8. In a preferred embodiment, the vent passages 14 have a diameter equal to or less than 0.2 mm so that under the pressures used in the injection operation the adhesive cannot be squeezed through them.

When no more adhesive 2 can be squeezed into the transverse passage 11 using the preferred injection pressures set forth herein, the metering adhesive nozzle 10 is withdrawn in the direction opposite to the arrow and the nozzle orifice is sealed by means of plunger 15. To achieve a smooth closure of the opening 9, the closure operation can be closely controlled so that the opening 9 is still being filled with adhesive 2 when withdrawal of the metering adhesive nozzle 10 is begun.

Figure 2:
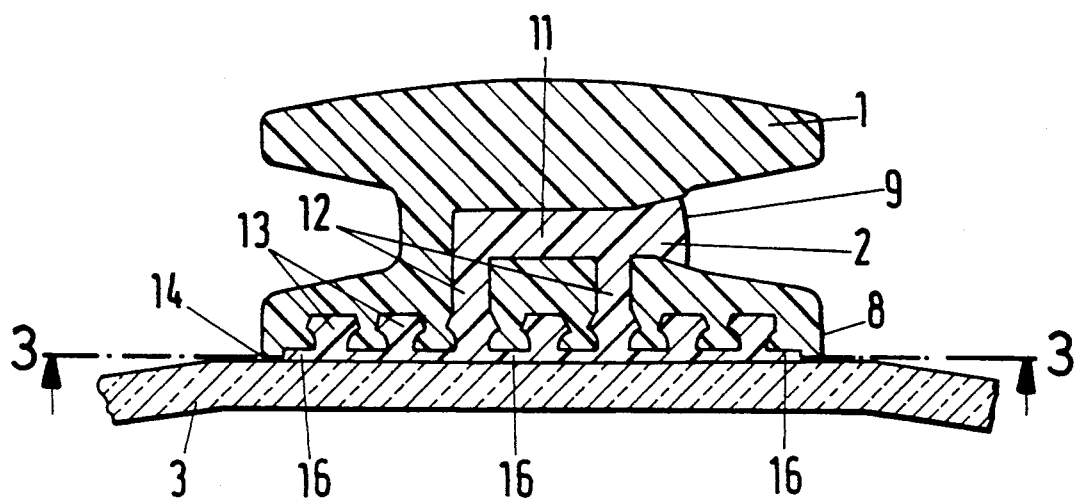
FIG. 2 is a vertical cross-sectional view of the grip element and article in FIG. 1, illustrating the distribution of adhesive in and on the grip element and article.

FIG. 2 shows knob 1 after it has been filled with adhesive 2 and secured to an article 3. The adhesive 2 fills conical opening 9, transverse passage 11, vertical passage 12 and the undercut annular groove 13. Since the outboard diameter of groove 13 is smaller than the inboard or interior diameter, the cured adhesive which completely fills the groove thus forms a secure locking connection with knob 1. The adhesive 2 is distributed over the entire adhesive area 16 which is bordered by the skirt 8. Adhesive material securely holds knob 1 to glass lid 3 both by adhesion and by the mechanical lock (the solidified adhesive in the grooves).

Figure 3:
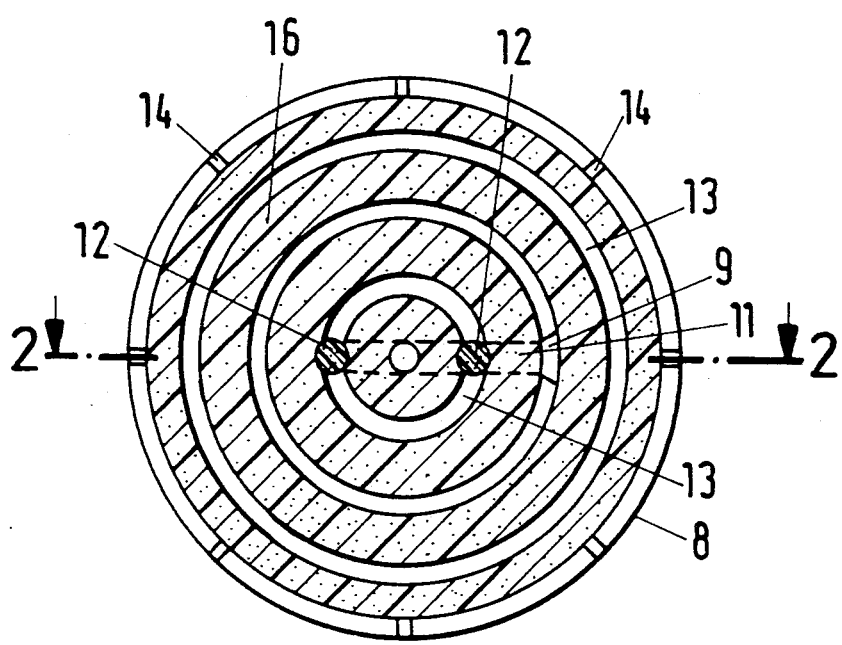
FIG. 3 is a cross-sectional view taken along line 3—3 of FIG. 2, particularly illustrating the passage through which adhesive flows in the grip element, and the concentric grooves formed on the surface of the grip element.

FIG. 3 shows the adhesion area 16 of knob 1 taken along line III—III of FIG. 2. The adhesive passes through opening 9, transverse passage 11 and an angled or vertical passage 12 where it spreads radially outwardly into at least one undercut annular groove 13, and is then distributed over the entire adhesion area 16 up to the skirt 8. The skirt acts as a dam containing the adhesive in the adhesive area bounded by the skirt.

A number of vent holes or passages 14 in skirt 8 permit venting of air displaced by the adhesive. When the process and apparatus of the present invention are used, the space between the adhesion area 16 on knob 1 and the glass lid 3 is completely filled with adhesive. The vent holes thus facilitate the formation of a substantially bubble-free adhesion area 16. Crockery or pottery articles suitable for use in microwave ovens and baking ovens can be obtained by using an adhesive compositions according to the present invention which is temperature-resistant up to about 280° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing, all temperatures are set forth uncorrected in degrees Celsius and unless otherwise indicated, all parts and percentages are by weight.

The entire texts of all applications, patents and publications, if any, cited above and below, and of corresponding German application P 38 26 314.9, are hereby incorporating by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A grip element to be secured to a pottery or crockery article with an adhesive, the grip element comprising:
    a body;
    a first face on the body for engaging the article, the first face including a peripheral skirt of a selected height having vent means therein and rib means of a height less than the selected height of the skirt, the rib means defining groove means therebetween; and
    a passage in the body communicating with the groove means and having an opening through the body spaced from the first face for receiving an injection of adhesive, whereby the adhesive flows from the groove means defined by the rib means to the peripheral skirt for bonding the grip element to the article.

2. The grip element of claim 1 further comprising a second face disposed in a direction opposite the first face for providing a surface against which a force may be applied to urge the first face against the article as adhesive is injected in the passage.

3. The grip element of claim 2, wherein the opening of the passage is disposed between the first and second faces.

4. The grip element of claim 3, wherein the opening opens laterally of the body with respect to the first and second faces.

5. A grip element according to claim 1, wherein the groove is undercut with its outboard diameter being smaller than its inboard diameter so that cured adhesive engages the grip element in a lock-forming manner.

6. A grip element according to claim 5, wherein the groove is annular.

7. A grip element according to claim 5, wherein the groove is spiral.

8. A grip element according to claim 1, wherein the groove is annular.

9. A grip element according to claim 1, wherein the groove is spiral.

10. The grip element of claim 1, wherein the peripheral skirt extends from said first face of the grip element a distance of from about 0.5 to 1.8 mm and the groove is undercut with an outboard diameter smaller than the inboard diameter.

11. The grip element of claim 1, wherein at least one groove formed in the first face is undercut with an outboard diameter smaller than the inboard diameter.

* * * * *